(12) United States Patent
Hsia

(10) Patent No.: US 7,103,194 B2
(45) Date of Patent: Sep. 5, 2006

(54) WALL HANGED AUDIO ARRANGEMENT

(76) Inventor: Ben M. Hsia, 10671 Lanark St., Sun Valley, CA (US) 91352

( * ) Notice: Subject to any disclaimer, the term of this patent is extended or adjusted under 35 U.S.C. 154(b) by 401 days.

(21) Appl. No.: 10/672,870

(22) Filed: Sep. 29, 2003

(65) Prior Publication Data

US 2005/0067540 A1 Mar. 31, 2005

(51) Int. Cl.
*H04R 1/02* (2006.01)
*H04R 5/02* (2006.01)
(52) U.S. Cl. .................. 381/388; 381/306; 381/386
(58) Field of Classification Search ............... 381/104, 381/150, 304, 305, 306, 311, 386, 388; 369/75.11, 369/75.27, 77.11, 77.21; 704/225
See application file for complete search history.

(56) References Cited

U.S. PATENT DOCUMENTS 3,848,090 A * 11/1974 Walker ....................... 381/388
6,311,155 B1 * 10/2001 Vaudrey et al. ............. 704/225
2004/0091124 A1 * 5/2004 Chua et al. .................. 381/104

* cited by examiner

*Primary Examiner*—Sinh Tran
*Assistant Examiner*—Brian Ensey
(74) *Attorney, Agent, or Firm*—Raymond Y. Chan; David & Raymond Patent Group

(57) ABSTRACT

A wall hanged audio arrangement, which is adapted for mounting on a wall surface to communicatively connect with a video device, includes an artistic casing having a front artistic surface, a rear wall installing surface, a side peripheral surface, and an operation cavity defining therewithin, a wall mounting device for mounting the rear wall installing surface of the artistic casing on the wall surface, and an audio device, which is received in the operation cavity, including an audio unit and an audio outlet which is provided on the side peripheral surface of the artistic casing and electrically connected to the audio unit for communicating with the video device. Therefore, the wall hanged audio arrangement forms as an artistic work to hang on the wall surface.

16 Claims, 3 Drawing Sheets

WALL HANGED AUDIO ARRANGEMENT

BACKGROUND OF THE PRESENT INVENTION

1. Field of Invention

The present invention relates to an Audio-Video (AV) system, and more particularly to a wall hanged audio arrangement which is compact in size, and is capable of being conveniently mounted onto a supporting surface, such as a wall, in an atheistically sound manner.

2. Description of Related Arts

Conventional AV systems, such as a Digital Video Disc (DVD) system, can be found in almost every family and even in workplaces, though their components, such as the loud speakers, are usually bulky in size. Nowadays, it seems that AV system is one of the essential ingredients in people's lives. A wide range of AV accessories, such as stands, wall-mounting supports, hangers, AV boxes and different kinds of furniture are accordingly rapidly developed and widely utilized by many people to hold or support their AV systems in particular situations.

However, all these existing holding or supporting accessories for AV systems are bulky either. When one is trying to relax and enjoy his/her favorite movie with his/her most favorite AV system, he/she may suddenly discover that in the vicinity of the, say, video display, such as a television, there exist parts of the accessories or even the AV system itself which are atheistically unsound (because they are not intended to be displayed) to block or at best interfere with the vision of the user of the AV system. Then, what is originally a good time is inevitably ruined by such kinds of 'external factors'. In worse, the vision or audibility of the user of the AV system may be severely blocked to an unacceptable degree so as to discourage him/her from utilizing the AV system, even though the AV system per se is perfect.

Nowadays, technology is advancing at a dramatic speed and most of the AV systems have been slimmed up with enhanced performance. Conventional holding or supporting accessories for AV systems are then changed to meet the corresponding needs of the more modern AV systems. For example, the conventional holding or supporting accessories may be reduced in size, reduced in thickness, or reduced in materials used to meet the fashion.

While these AV accessories are kept in pace, they are after all inevitable. No matter how fast such AV accessories are developed, they are nevertheless required to keep the corresponding AV systems to operate properly in a various surrounding circumstances. When one trying to buy an AV system, his/her first consideration, apart from the quality of the AV system, would be how the system could be supported and connected in a secure manner yet not to deteriorate their aesthetical features. Very often, these two considerations form a good deal of pressing and conflicting problems for the user of the AV system. It is obvious that the more bulky and the more numbers of supporting components presence in the accessory, the more secure the AV system can be supported. Unfortunately, the more bulky and the more numbers of supporting components presence in the accessory, the more likely that the AV system is deteriorated in terms of its audio and visual quality because of the possible blocking and interference of the accessory by which the AV system is supported.

It should be fairly accurate to suppose that the above requirement of the AV accessories is due to a general desire of people to improve and enhance their living environment, especially their home. In relation to this, indoor artistic objects, such as furniture with special design, sculpture, painting, drawings and plants, may be found in a house, a flat, an office, an apartment, or even an industrial factory. These kinds of artistic objects could provide a more relaxing atmosphere which promotes good emotion and mental fitness. However, especially for those living in a big city, it may be that it is difficult to have a position for placing furniture with special design, a sculpture or a painting simply because they are luxury in an environment where space is the most expensive. Or, it may be that for particular premises, due to an assigned function for that premises, such as business activities, it is simply unrealistic for such relaxing artistic objects to be placed inside the premises.

SUMMARY OF THE PRESENT INVENTION

A main object of the present invention is to provide a wall hanged audio arrangement, having a predetermined artistic work or pattern formed thereon, adapted to be conveniently mounted onto a supporting surface, such as a wall, without utilizing external AV accessories, such as a stand or a hanger, so that the AV arrangement, being aesthetically sound and self-standing, is capable of acting both as a regular AV system and an artistic objects or either one.

Another object of the present invention is to provide a wall hanged audio arrangement which occupies the minimum amount of space, as compared with conventional AV systems, in the environment in which it operates.

Another object of the present invention is to provide a wall hanged audio arrangement which is capable of acting as an artistic object to provide relaxing atmosphere to the environment in which it is placed. In other words, no additional space is required for artistic objects in additional to the AV system.

Another object of the present invention is to provide a wall hanged audio arrangement which has an artistic work formed thereon, wherein the AV system is adapted to be mounted on a wall of particular premises so as to form an artistic object of that premises to provide a pleasant environment.

Another object of the present invention is to provide a wall hanged audio arrangement which dismantles the interference of possible external AV accessories utilized for supporting the AV system.

Another object of the present invention is to provide a wall hanged audio arrangement which is capable of self-standing on a wide variety of surrounding circumstances so that it is adapted to be widely utilized for a wide range of situations.

Another object of the present invention is to provide a wall hanged audio arrangement which does not involve any expensive mechanical components so as to minimize the manufacturing cost and selling price thereof, thus indirectly promoting its popularity and creating a new fashion in society.

Accordingly, in order to accomplish the above objects, the present invention provides a wall hanged audio arrangement for mounting on a wall surface to communicatively connect with a video device, wherein the wall hanged audio arrangement comprises:

an artistic casing having a front artistic surface, a rear wall installing surface, a side peripheral surface, and an operation cavity defining within the front artistic surface, the rear wall installing surface, and the side peripheral surface, wherein a size of each of the front artistic surface and the rear wall installing surface is larger than a width of the side peripheral surface to form a slim structure of the artistic casing;

means for mounting the rear wall installing surface of the artistic casing on the wall surface; and an audio device, which is received in the operation cavity, comprising an audio unit and an audio outlet which is provided on the side peripheral surface of the artistic casing and is electrically connected to the audio unit for communicating with the video device.

These and other objectives, features, and advantages of the present invention will become apparent from the following detailed description, the accompanying drawings, and the appended claims.

DETAILED DESCRIPTION OF THE PREFERRED EMBODIMENT

Figure 1:
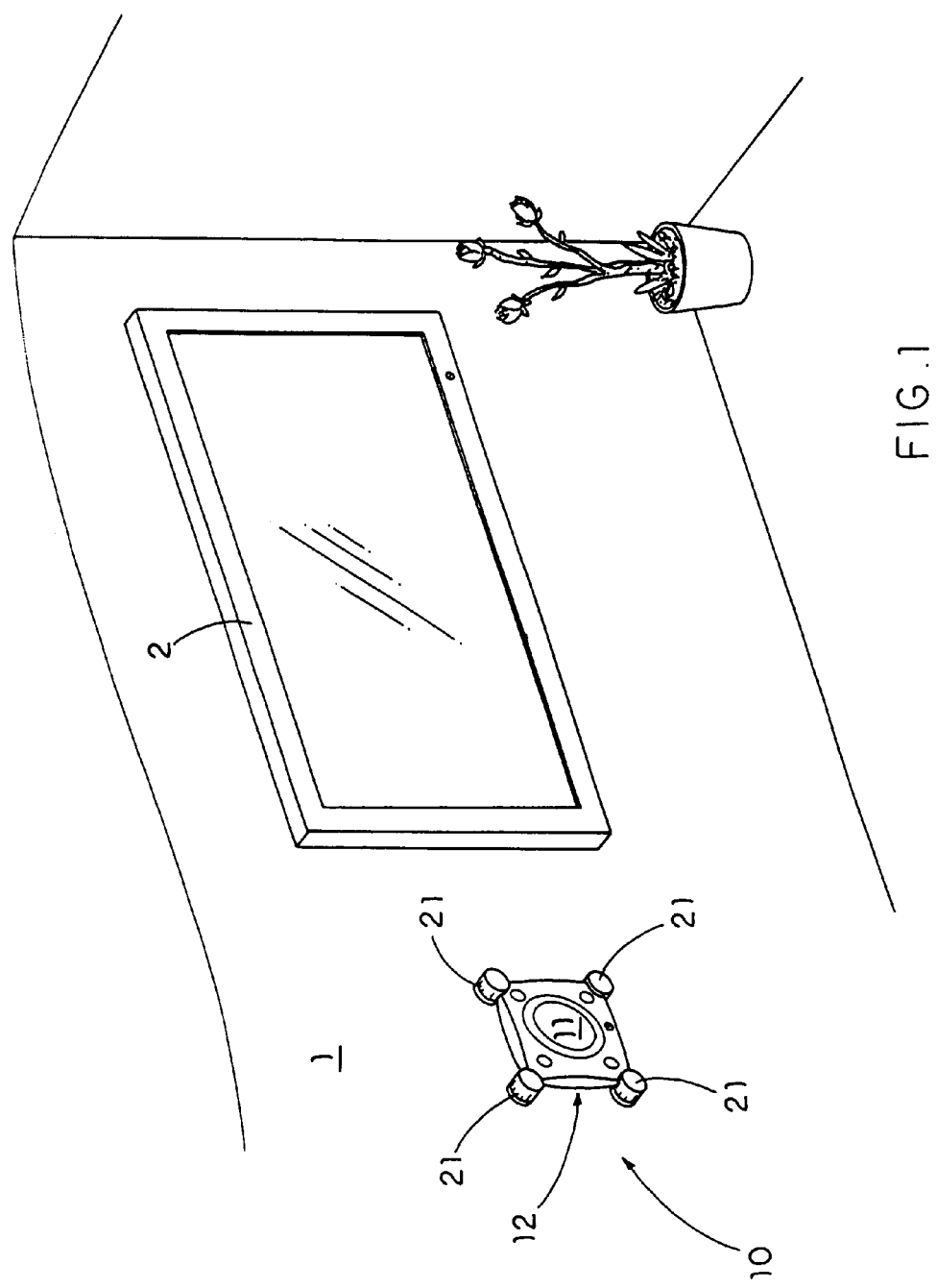
FIG. 1 is a perspective view of a wall hanged audio arrangement mounted on a wall surface to incorporate with a video device according to a preferred embodiment of the present invention.
Figure 2:
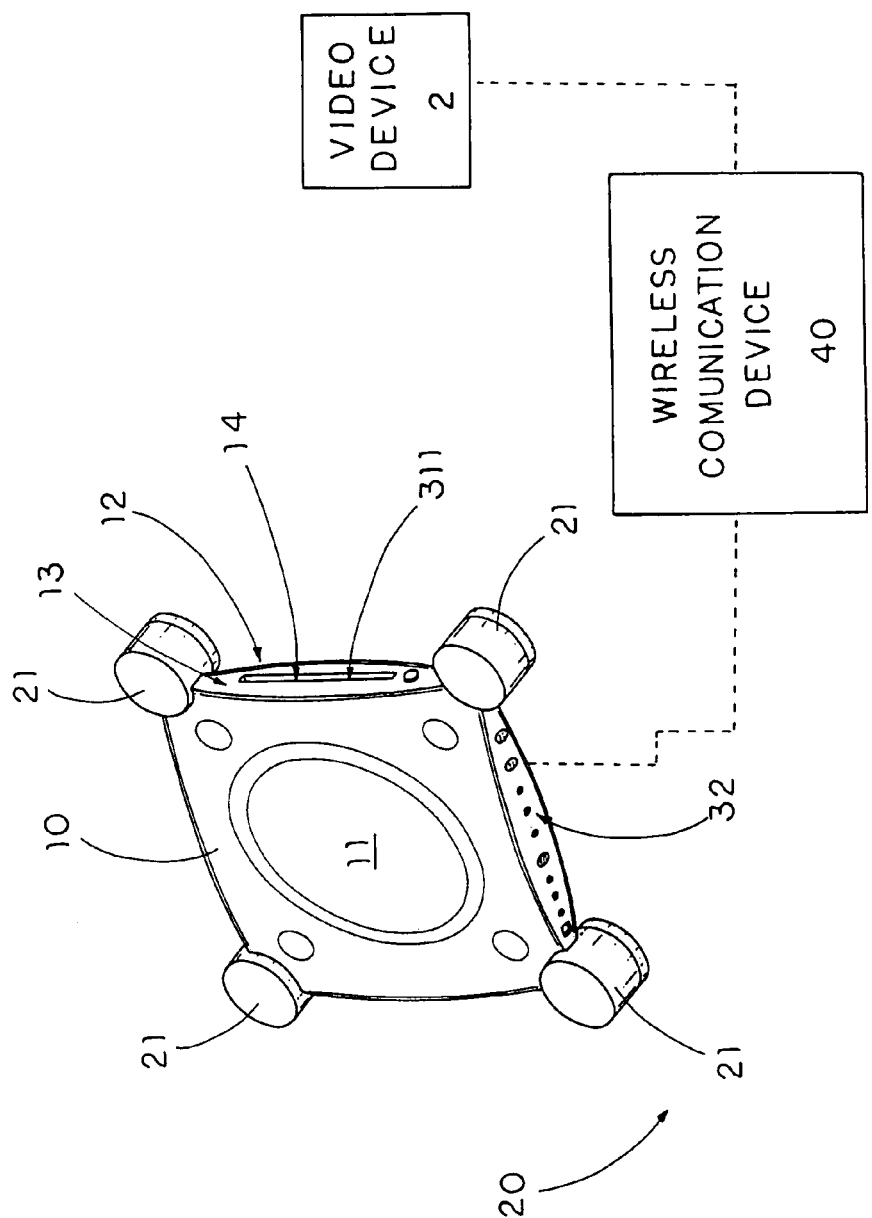
FIG. 2 is a perspective view of the wall hanged audio arrangement according to the preferred embodiment of the present invention.
Figure 3:
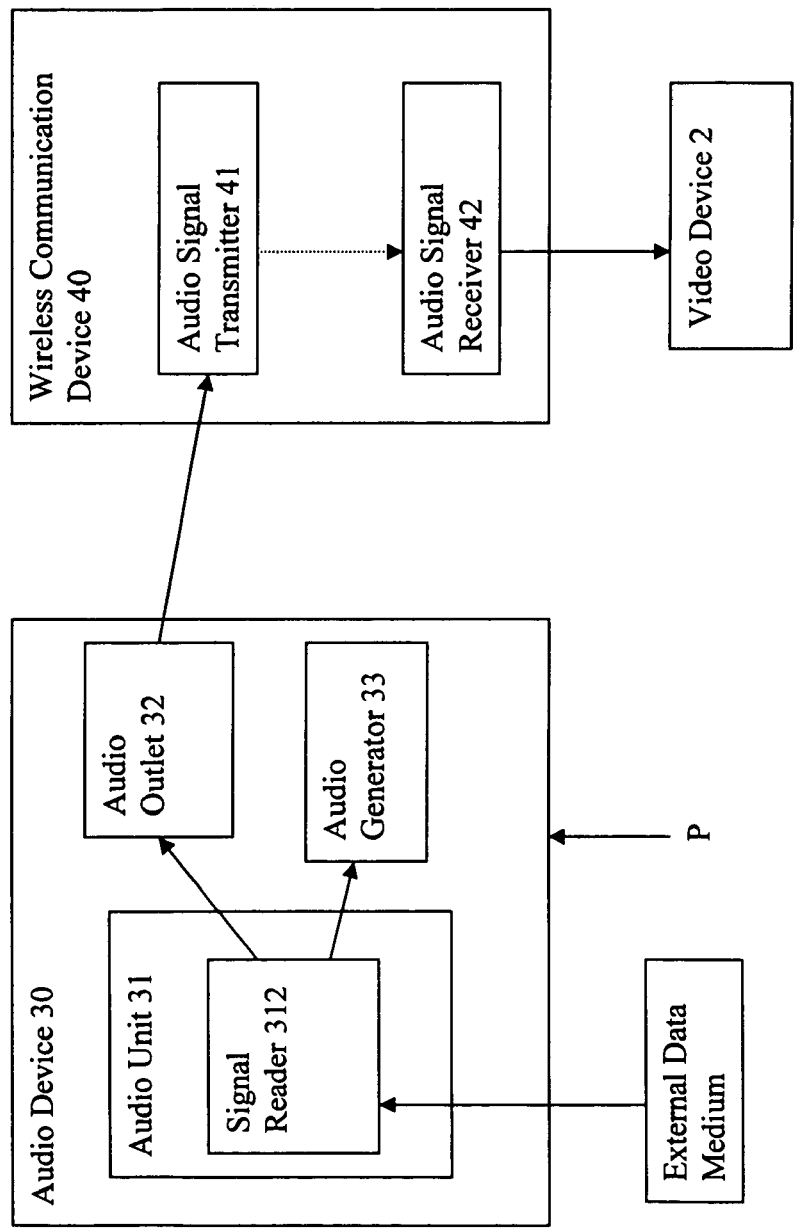
FIG. 3 is a schematic diagram of the operation of the wall hanged audio arrangement according to the above preferred embodiment of the present invention.

Referring to FIGS. 1 through 3 of the drawings, a wall hanged audio arrangement according to a preferred embodiment of the present invention is illustrated, wherein the wall hanged audio arrangement is adapted for mounting on a wall surface 1 to communicatively connect with a video device 2.

According to the preferred embodiment, the wall hanged audio arrangement comprises an artistic casing 10 having a front artistic surface 11, a rear wall installing surface 12, a side peripheral surface 13, and an operation cavity 14 defining within the front artistic surface 11, the rear wall installing surface 12, and the side peripheral surface 13, wherein a size of each of the front artistic surface 11 and the rear wall installing surface 12 is larger than a width of the side peripheral surface 13 to form a slim structure of the artistic casing 10 so as to occupy minimum amount of space in the environment in which the wall hanged audio arrangement operates.

The wall hanged audio arrangement further comprises means 20 for mounting the rear wall installing surface 12 of the artistic casing 10 on the wall surface 1, and an audio device 30, which is received in the operation cavity 14, comprising an audio unit 31 and an audio outlet 32 which is provided on the side peripheral surface 13 of the artistic casing 10 and electrically connected to the audio unit 31 for communicating with the video device 2.

Accordingly, the video device 2 can be embodied as a conventional video display device, such as a regular television which comprises a video display screen and an audio signal converter for receiving and converting electrical signal transmitted from the audio device 30. Therefore, the audio signal configured as the electrical signal can be transmitted between the video device 2 and the audio device 30. Alternatively, the video device 2 may be embodied as a regular image projector producing a slim image projecting screen on the wall surface 1. Other alternatives can include a flat panel television such as a plasma television or a Liquid Crystal Display Monitor (LCD), adapted to mount on the wall surface 1 to form a unique ornament when the wall hanged audio arrangement is incorporated therewith.

According to the preferred embodiment, the front artistic surface 11 of the artistic casing 10, which functions as an artistic display, is adapted for aesthetically enhancing the general appearance thereof, so that the wall hanged audio arrangement itself is capable of being a relaxing artistic work.

Referring to FIGS. 1 and 2 of the drawings, the front artistic surface 11 of the artistic casing 10 contains a predetermined kind of artistic work to enhance the overall appearance thereof. The artistic work may be in the forms of colorful coating, painting, a plurality of decorative members provided in front of the artistic casing 10. According to the preferred embodiment of the present invention, the artistic work takes the form of a four decorative legs attached on four corner portions of the artistic casing 10 so as to enhance the general appearance thereof. Moreover, an artistic dying layer can be coated in front of the artistic casing 10 to form as the front artistic surface 11 thereof for enhancing fancy appearance.

Accordingly, the artistic casing 10 has a length (L) defining as the size of each of the front artistic surface 11 and the rear wall installing surface 12 substantially greater than a depth (D) defining as the width of the side peripheral surface 13 so that the artistic casing 10 forms a very slim structure for minimizing a distance between the front artistic surface 11 of the artistic casing 10 and the wall surface 11 so as to occupy minimum amount of space in the environment in which the wall hanged audio arrangement operates.

Moreover, the width of the side peripheral surface 13 is preferably made to be as short as possible so as to reduce the overall volume of the artistic casing 10. According to the preferred embodiment of the present invention, the artistic casing 10 has a rectangular shape to form the rectangular front artistic surface 11, the rectangular rear wall installing surface 12 and four side peripheral surfaces 13. However, any other shape which is of slim and compact structure as such may be employed. Indeed, depending on the surrounding circumstances of the environment the video device 2 operates, the shape of the artistic casing 10 may be suitably varied without violating the spirit of the subject matter of the present invention.

It is worth mention that the wall hanged audio arrangement of the present invention comprises a very slim artistic casing 10 with the audio device 30, so that it ultimately provides a compact, aesthetically sound, self-suspended standing ability (on the wall surface 1), to completely fulfill the above-mentioned invention objects. An example of its operation is shown in FIG. 1 of the drawings.

The wall mounting means 20, according to the preferred embodiment, comprises a plurality of wall attaching arms 21 spacedly and outwardly extended from the side peripheral surface 13 of the artistic casing 10 for securely mounting the rear wall installing surface 12 of the artistic casing 10 on the wall surface 1 via screws. Alternatively, the wall mounting means 20 can be embodied as a hanging pin affixed to predetermined position on the wall surface 1, wherein a corresponding hanging slot is formed on the rear wall installing surface 12 of the artistic casing 10 in such a manner that the hanging pin of the wall mounting means 20 is adapted to be engaged with the hanging slot so as to detachably hang the artistic casing 10 onto the wall surface 1. Moreover, the wall mounting means 20 may even be embodied as an adhesive element applied on the rear wall installing surface 12 of the artistic casing 10 so as to suspendedly support the artistic casing 10 on the wall surface 1.

The audio unit 31, which is embodied as a DVD player electrically connected to a power source P, has an inserting slot 311 formed on the side peripheral surface 13 to communicate with the operation cavity 14 and comprises a signal reader 312 received in the operation cavity 14 of the artistic casing 10 for reading a predetermined kind of audio and video signal from an external data medium, such as a DVD or a Video Compact Disc (VCD) inserting into the operation cavity 14 through the inserting slot 311.

In other words, the signal reader 312 is adapted to read the audio/video signal from the external data medium by inserting the external data medium into the operation cavity 14 through the inserting slot 311 at the side of the artistic casing 10 so as to keep the aesthetic appearance of the front artistic surface 11 of the artistic casing 10 with the compact slim structure thereof.

Accordingly, data retrieved from the signal reader 312 preferably comprises a signal processing circuitry for electrically decoding, amplifying, filtering and rectifying signal read from the external data medium. The signal received will then be digitally decoded, amplified and then filtered. After that, the processed signal will then be fed to the audio output 32 where the processed signal is re-encoded to form an output signal, preferably by a signal encoding circuitry. The output signal is ultimately transmitted to the video device 2 via electric cables. Accordingly, a corresponding acoustical sound and image will be generated by the audio device 30 and the video device 2 respectively in accordance with the data stored in the external data medium, i.e. the DVD or VCD.

It is worth to mention that the audio output 32 is provided at the side peripheral surface 13 of the artistic casing 10 to keep the aesthetic appearance of the front artistic surface 11 of the artistic casing 10 while the rear wall installing surface 12 of the artistic casing 10 is arranged to mount on the wall surface 1. In addition, when the electric cables are required to electrically connect the wall hanged audio arrangement with the video device 2, the electric cables are extended from the side peripheral surface 13 of the artistic casing 10 through the audio output 32 to align with the wall surface 1 so as to minimize the occupy space of the electric cables with aesthetic appearance.

According to the preferred embodiment, the audio device 30 further comprises an audio generator 33 electrically connected with the audio unit 31 for sound generation through the front artistic surface 11 of the artistic casing 10. Accordingly, the audio generator 33 comprises a speaker received in the operation cavity 14 of the artistic casing 10 wherein when the audio signal is transmitted from the audio unit 31 to the audio generator 33, the audio signal is converted into an audible sound and is output through the front artistic surface 11 of the artistic casing 10.

Therefore, the wall hanged audio arrangement of the present invention can be incorporated with the video device 2 to form a home theater while the audio device 30 can be embodied as a built-in speaker system to form a slim structure of the artistic casing 10 so as to minimize the amount of space occupied. For those who require sophisticated sound effect, a plurality of loud speakers may be utilized to generate a wide range of pleasant sound effect, such as surround sound. The wall hanged audio arrangement can be hanged onto the wall surface 1 at different positions to produce optimal sound effect or audibility.

According to the preferred embodiment, the wall hanged audio arrangement further comprises a wireless communication device 40 connected with the audio device 30 for wirelessly connecting with the video device 2. Therefore, no electric cable is required to wire between the audio device 30 and the video device 2 so as to further enhance the artistic appearance of the artistic casing 10.

The wireless communication device 40 comprises an audio signal transmitter 41 provided at the audio outlet 32 to transmit an audio signal from the audio unit 31 and an audio signal receiver 42, which is adapted for operatively connecting to the video device 2, wirelessly communicating with the audio signal transmitter 41 to receive the audio signal therefrom in a wireless manner for wirelessly communicating the audio device 30 with the video device 2.

As shown in FIG. 3, the audio signal transmitter 41 comprises a radio frequency transmitting device adapted to send and receive the audio signal in form of radio frequency, wherein the radio frequency transmitting device functions as a wireless communication link between the audio signal receiver 42 and the audio unit 31 for wirelessly communicating the audio device 30 with the video device 2.

The audio signal receiver 42 is a wireless signal receiving device adapted to wirelessly receive the audio signal in form of radio frequency from the audio signal transmitter 41, wherein the audio signal receiver 42 is automatically tuned to match with the radio frequency of the audio signal transmitter 41 to wirelessly communicate with the audio unit 31. Likewise, the audio signal receiver 42 can be manually tuned to match with the radio frequency of the audio signal transmitter 41 to wirelessly communicate with the audio unit 31.

Alternatively, the audio signal transmitter 41 comprises an infrared transmitting device adapted to send and receive the audio signal in form of infrared signal, wherein the audio signal transmitter 41 functions as a wireless communication link between the audio signal receiver 42 and the audio unit 31 for wirelessly communicating the audio device 30 with the video device 2.

The audio signal receiver 42 is a wireless signal receiving device adapted to wirelessly receive the audio signal in form of infrared signal from the audio signal transmitter 41, wherein the audio signal receiver 42 is automatically programmed to match with the infrared signal of the audio signal transmitter 41 to wirelessly communicate with the audio unit 31. Likewise, the audio signal receiver 42 can be manually programmed to match with the infrared signal of the audio signal transmitter 41 to wirelessly communicate with the audio unit 31.

It is worth to mention that it is effective to wirelessly connect the wall hanged audio arrangement of the present invention with the video device 2 through the radio frequency or the infrared signal since the distance between the wall hanged audio arrangement and the video device is close enough to prevent any interference of the wireless signal therebetween. Thus, when the wireless communication device 40 is used to wirelessly connect the audio device 30 with the video device 2, the electric cable can be omitted so as to keep the artistic appearance of the artistic casing 10.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles

What is claimed is:

1. A wall hanged AV arrangement for mounting on a wall surface to communicatively connect with a video device, wherein the wall hanged AV arrangement comprises:

an artistic casing having a front artistic surface, a rear wall installing surface, a side peripheral surface, and an operation cavity defining within said front artistic surface, said rear wall installing surface, and said side peripheral surface, wherein a size of each of said front artistic surface and said rear wall installing surface is larger than a width of said side peripheral surface to minimize a thickness of said artistic casing so as to form a slim structure of said artistic casing;

an audio device comprising an audio unit received in said operation cavity, an audio outlet which is provided on said side peripheral surface of said artistic casing and is electrically connected to said audio unit, an inserting slot formed on said peripheral surface of said artistic casing to communicate with said operation cavity thereof, and a signal reader received in said operation cavity for reading audio signal and video signal of an external data medium inserting through said inserting slot so as to output said audio signal and video signal to said video device; and a wall mounting unit comprising a plurality of wall attaching arms spacedly and outwardly extended from said peripheral surface of said artistic casing for suspendedly mounting said artist casing on said wall surface at a position that said rear wall installing surface of said artistic casing is aligned with said wall surface and said front artistic surface of said artistic casing is positioned with respect to said wall surface at a planar manner.

2. The wall hanged AV arrangement, as recited in claim 1, wherein said audio device further comprises an audio generator which is received in said operation cavity of said artistic casing and electrically connected with said audio unit for outputting said audio signal as audible sound through said front artistic surface of said artistic casing.

3. The wall hanged AV arrangement, as recited in claim 1, further comprises a wireless communication device connected with said audio device for wirelessly connecting with said video device, wherein said wireless communication device comprises an audio signal transmitter provided at said audio outlet to transmit an audio signal from said audio unit and an audio signal receiver, which is adapted for operatively connecting to said video device, wirelessly communicating with said audio signal transmitter to receive said audio signal therefrom in a wireless manner for wirelessly communicating said audio device with said video device.

4. The wall hanged AV arrangement, as recited in claim 2, further comprises a wireless communication device connected with said audio device for wirelessly connecting with said video device, wherein said wireless communication device comprises an audio signal transmitter provided at said audio outlet to transmit an audio signal from said audio unit and an audio signal receiver, which is adapted for operatively connecting to said video device, wirelessly communicating with said audio signal transmitter to receive said audio signal therefrom in a wireless manner for wirelessly communicating said audio device with said video device.

5. The wall hanged AV arrangement, as recited in claim 3, wherein said audio signal transmitter comprises a radio frequency transmitting device adapted to send and receive said audio signal in form of radio frequency, wherein said radio frequency transmitting device functions as a wireless communication link between said audio signal receiver and said audio unit for wirelessly communicating said audio device with said video device.

6. The wall hanged AV arrangement, as recited in claim 4, wherein said audio signal transmitter comprises a radio frequency transmitting device adapted to send and receive said audio signal in form of radio frequency, wherein said radio frequency transmitting device functions as a wireless communication link between said audio signal receiver and said audio unit for wirelessly communicating said audio device with said video device.

7. The wall hanged AV arrangement, as recited in claim 5, wherein said audio signal receiver is a wireless signal receiving device adapted to wirelessly receive said audio signal in form of radio frequency from said audio signal transmitter, wherein said audio signal receiver is automatically tuned to match with said radio frequency of said audio signal transmitter to wirelessly communicate with said audio unit.

8. The wall hanged AV arrangement, as recited in claim 6, wherein said audio signal receiver is a wireless signal receiving device adapted to wirelessly receive said audio signal in form of radio frequency from said audio signal transmitter, wherein said audio signal receiver is automatically tuned to match with said radio frequency of said audio signal transmitter to wirelessly communicate with said audio unit.

9. The wall hanged AV arrangement, as recited in claim 5, wherein said audio signal receiver is a wireless signal receiving device adapted to wirelessly receive said audio signal in form of radio frequency from said audio signal transmitter, wherein said audio signal receiver is manually tuned to match with said radio frequency of said audio signal transmitter to wirelessly communicate with said audio unit.

10. The wall hanged AV arrangement, as recited in claim 6, wherein said audio signal receiver is a wireless signal receiving device adapted to wirelessly receive said audio signal in form of radio frequency from said audio signal transmitter, wherein said audio signal receiver is manually tuned to match with said radio frequency of said audio signal transmitter to wirelessly communicate with said audio unit.

11. The wall hanged AV arrangement, as recited in claim 3, wherein said audio signal transmitter comprises an infrared transmitting device adapted to send and receive said audio signal in form of infrared signal, wherein said audio signal transmitter functions as a wireless communication link between said audio signal receiver and said audio unit for wirelessly communicating said audio device with said video device.

12. The wall hanged AV arrangement, as recited in claim 4, wherein said audio signal transmitter comprises an infrared transmitting device adapted to send and receive said audio signal in form of infrared signal, wherein said audio signal transmitter functions as a wireless communication link between said audio signal receiver and said audio unit for wirelessly communicating said audio device with said video device.

13. The wall hanged AV arrangement, as recited in claim 11, wherein said audio signal receiver is a wireless signal receiving device adapted to wirelessly receive said audio signal in form of infrared signal from said audio signal transmitter, wherein said audio signal receiver is automatically programmed to match with said infrared signal of said audio signal transmitter to wirelessly communicate with said audio unit.

14. The wall hanged AV arrangement, as recited in claim 12, wherein said audio signal receiver is a wireless signal receiving device adapted to wirelessly receive said audio signal in form of infrared signal from said audio signal transmitter, wherein said audio signal receiver is automatically programmed to match with said infrared signal of said audio signal transmitter to wirelessly communicate with said audio unit.

15. The wall hanged AV arrangement, as recited in claim 11, wherein said audio signal receiver is a wireless signal receiving device adapted to wirelessly receive said audio signal in form of infrared signal from said audio signal transmitter, wherein said audio signal receiver is manually programmed to match with said infrared signal of said audio signal transmitter to wirelessly communicate with said audio unit.

16. The wall hanged AV arrangement, as recited in claim 12, wherein said audio signal receiver is a wireless signal receiving device adapted to wirelessly receive said audio signal in form of infrared signal from said audio signal transmitter, wherein said audio signal receiver is manually programmed to match with said infrared signal of said audio signal transmitter to wirelessly communicate with said audio unit.

* * * * *